(Model.)
A. J. HART.
VEHICLE WHEEL.
No. 264,287. Patented Sept. 12, 1882.
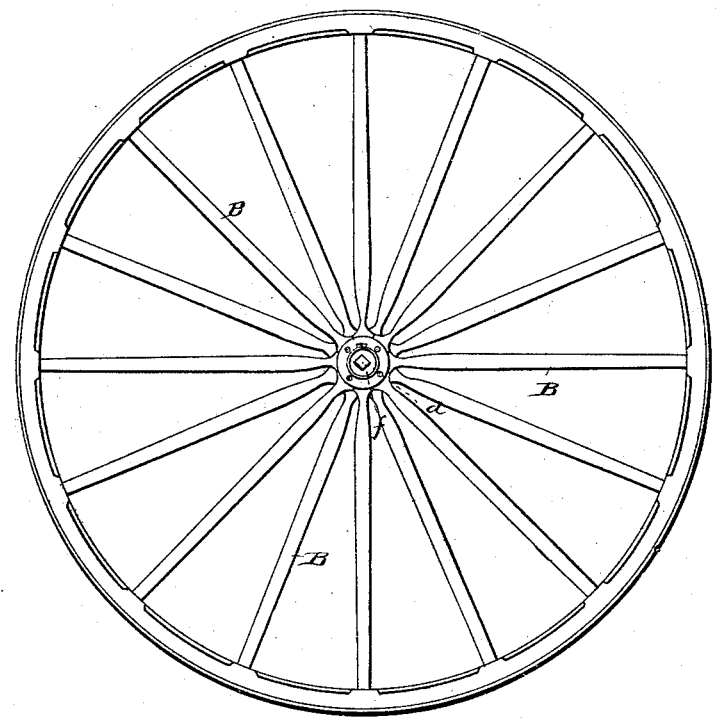
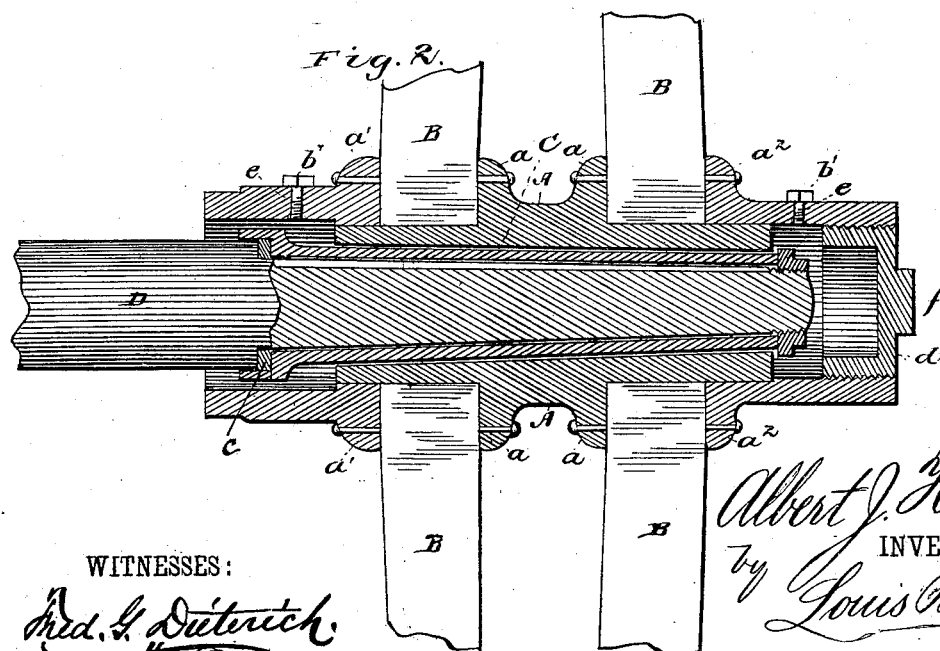
WITNESSES:
Albert J. Hart,
INVENTOR.
by Louis Bagger
ATTORNEYS.

UNITED STATES PATENT OFFICE.

ALBERT J. HART, OF LIGONIER, INDIANA.

VEHICLE-WHEEL.

SPECIFICATION forming part of Letters Patent No. 264,287, dated September 12, 1882.

Application filed June 17, 1882. (Model.)

*To all whom it may concern:*

Be it known that I, ALBERT J. HART, of Ligonier, in the county of Noble and State of Indiana, have invented certain new and useful Improvements in Wheels for Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation of my improved vehicle-wheel, and Fig. 2 is a horizontal section taken through the hub and boxing.

This invention pertains to an improvement in vehicle-wheels, having for its object to promote combined lightness and strength and facility in oiling or lubricating the parts otherwise in frictional contact; and it consists of a hub or cylinder with two annular flanges formed thereon, one on each side of a central point of the cylinder, against which two sets of spokes are secured by rings having flanges slipped thereon, and said flanges bolted to the flanges of the cylinder, while inserted within said cylinder or hub proper is a thimble fitted with a packing-ring, against which the screw-threaded ring or sand-band screws; and fitting within said thimble is the axle-arm fitted with a nut, over which fits a second nut screwed into the said cylinder, substantially as hereinafter more fully set forth.

In the accompanying drawings, A refers to a cylinder or the hub proper, upon which two annular flanges, $a\ a$, are formed, one on each side of a central point thereof, which constitute the inner halves of two annular sockets, which receive the two sets of spokes B. The other halves of the said sockets are formed by means of rings $a'$, having similar flanges, $a^2$, which, after the arrangement in place of the spokes against the flanges $a\ a$, are forced up against the outside of the spokes by slipping their rings upon the cylinder or hub proper, A, and toward the spokes. The flanges of each socket are bolted together and firmly against the spokes. It will be observed that the individual spokes of the two sets alternate with each other, and are thus enabled to be fastened at their outer ends to a common rim, made in the usual way, thus permitting the making the wheel of the usual lightness at that point, while by the increased length of hub and the double point of attachment of the spokes thereat greater strength is obtained without measurably enlarging the dimensions of the hub. Through the cylinder or boxing A are made lubricating or oiling apertures $b$, one arranged at each end, and closed by suitable screw-plugs, $b'$, which permit the ready lubricating the axle without requiring the removal of the wheel, thus avoiding the accidental entrance of sand or other extraneous matter on such occasions.

C is a thimble inserted into the cylinder, forming a suitable bearing therein for the axle D, and wedged by the tapering form of the bore of the cylinder in place at one end, while its other or enlarged end is packed by a ring, $c$, against which the thimble C is forced by action of the nut $e$. An annular nut or the sand-band $d$ is screwed into the end of the cylinder or boxing A, and projecting beyond it to protect the surrounding space as against the entrance of sand or other foreign substance. The opposite end of the axle-arm is suitably nutted, as at $e$, and over this nut is fitted a cap or second nut, $f$, screwed into the boxing or cylinder A.

I claim and desire to secure by Letters Patent of the United States—

In a vehicle-wheel, the combination of the axle D, cylinder A, and thimble C with the packing-ring $c$, nut $e$, and sand-nut $d$, all constructed and arranged to serve as and for the purposes specified.

In testimony that I claim the foregoing as my own I have hereunto affixed my signature in presence of two witnesses.

ALBERT J. HART.

Witnesses:
ENOS D. MESSIMON,
EDMOND C. OHLEVINE.